US012811161B2

(12) United States Patent
Abdul Jabbar

(10) Patent No.: US 12,811,161 B2
(45) Date of Patent: Nov. 24, 2026

(54) METAL-REINFORCED SOLID BASED FUEL CELL ELECTRODES

(71) Applicant: Nissan North America, Inc., Franklin, TN (US)

(72) Inventor: Mohammed Hussain Abdul Jabbar, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 536 days.

(21) Appl. No.: 18/375,188

(22) Filed: Sep. 29, 2023

(65) Prior Publication Data

US 2025/0112249 A1 Apr. 3, 2025

(51) Int. Cl.

| | |
|---|---|
| ***H01M 8/1213*** | (2016.01) |
| ***H01M 4/90*** | (2006.01) |
| ***H01M 8/0271*** | (2016.01) |
| ***H01M 8/1253*** | (2016.01) |
| *H01M 8/12* | (2016.01) |

(52) U.S. Cl.

CPC ......... *H01M 4/9033* (2013.01); *H01M 4/905* (2013.01); *H01M 8/0271* (2013.01); *H01M 8/1213* (2013.01); *H01M 8/1253* (2013.01); *H01M 2008/1293* (2013.01)

(58) Field of Classification Search

CPC ............. H01M 8/0271; H01M 8/1213; H01M 8/1253; H01M 4/9033; H01M 4/905

See application file for complete search history.

(56) References Cited

U.S. PATENT DOCUMENTS

| | | | | |
|---|---|---|---|---|
| 5,021,304 | A * | 6/1991 | Ruka | G01N 27/4075 429/535 |
| H1260 | H * | 12/1993 | Towe | H01M 8/1213 156/89.18 |
| 5,474,800 | A * | 12/1995 | Matsuzaki | B22F 1/148 427/126.3 |
| 5,629,103 | A * | 5/1997 | Wersing | H01M 8/1213 429/480 |
| 6,248,468 | B1 * | 6/2001 | Ruka | H01M 4/9066 429/488 |
| 11,063,271 | B2 | 7/2021 | Abdul Jabbar | |
| 11,417,903 | B2 | 8/2022 | Abdul Jabbar | |
| 2004/0096572 | A1 | 5/2004 | Chen et al. | |
| 2009/0092877 | A1 | 4/2009 | Yoshikata | |
| 2009/0117435 | A1 * | 5/2009 | Du | H01M 8/2425 429/94 |

(Continued)

FOREIGN PATENT DOCUMENTS

| | | |
|---|---|---|
| JP | 2009026511 A | 2/2009 |
| JP | 6281256 B2 | 9/2013 |

*Primary Examiner* — Kenneth J Douyette

(74) *Attorney, Agent, or Firm* — Young Basile Hanlon & MacFarlane, P.C.

(57) ABSTRACT

A solid based fuel cell has a cathode layer, an interlayer, an electrolyte layer, and a metal-reinforced anode. The metal-reinforced anode has a first layer of first metal particles coated with solid electrolyte, the first metal particles embedded in anode active material, a second layer of metal through which holes are formed in a thickness direction, the holes filled with second metal particles coated with additional solid electrolyte, and a third layer of third metal particles coated with yet additional solid electrolyte, the third metal particles embedded in reforming catalyst.

19 Claims, 2 Drawing Sheets

(56) References Cited

U.S. PATENT DOCUMENTS

| | | | | |
|---|---|---|---|---|
| 2012/0244456 | A1 * | 9/2012 | Muecke .............. | H01M 4/8636 429/527 |
| 2023/0096327 | A1 | 3/2023 | Abdul Jabbar et al. | |

* cited by examiner

METAL-REINFORCED SOLID BASED FUEL CELL ELECTRODES

TECHNICAL FIELD

This disclosure relates to metal-reinforced solid based fuel cell electrodes, including both solid oxide fuel cells and protonic ceramic fuel cells.

BACKGROUND

Solid based fuel cells allow for conversion of electrochemical fuel to electricity with negligible pollution relative to fuel of choice. Among fuel cells under development, solid oxide fuel cells (SOFCs) operate at temperatures ranging from 500° C. to 1000° C. Because the SOFCs operate at such high temperature, the materials used as components are thermally challenged. Protonic ceramic fuel cells (PCFCs) reduce the operating range to about 400° C. to 600° C. but continue to see similar challenges in addition to resistive electrode processes and ionic mobility issues within SOFCs.

Conventional (SOFCs) having an electrolyte-supported configuration have poor mechanical strength and exhibit poor performance due to high electrolyte resistance. SOFCs having an electrode-supported configuration are somewhat stronger and better performing than the electrolyte-supported configurations. However, the SOFCs having an electrode-supported configuration also fail to meet the strength and performance requirements needed for automotive applications, due, in part, to the rapid heating and cooling cycles during start-up or switch off of the fuel cell.

Solid based fuel cells can operate with various fuels; however, to operate with non-hydrogen fuels, e.g., hydrocarbons and ethanol, solid based fuel cells require a reformer to reform hydrocarbon fuels to produce hydrogen from the non-hydrogen fuels. External reformers require additional space and add additional cost. Attempts at internalizing the reformation by using catalyst to internally reform the non-hydrogen fuels adds internal resistance, reducing the power output, as reforming catalysts are poor electronic conductors.

SUMMARY

Disclosed herein are implementations of solid based fuel cells with metal-reinforced anodes as disclosed herein. The metal-reinforced anodes provide lower cost manufacturing, faster startup, thinner overall cells, reforming capabilities and carbon neutrality, as examples.

An implementation of a solid based fuel cell has a cathode layer, an interlayer, an electrolyte layer, and a metal-reinforced anode. The metal-reinforced anode has a first layer of first metal particles coated with solid electrolyte, the first metal particles embedded in anode active material, a second layer of metal through which holes are formed in a thickness direction, the holes filled with second metal particles coated with additional solid electrolyte, and a third layer of third metal particles coated with yet additional solid electrolyte, the third metal particles embedded in reforming catalyst.

An implementation of a metal-reinforced anode for a solid based fuel cell has a first layer of first metal particles coated with solid electrolyte, the first metal particles embedded in anode active material, the first layer having a first seal around a perimeter of the first layer. The metal-reinforced anode has a second layer of metal through which holes are formed in a thickness direction, the holes filled with second metal particles coated with additional solid electrolyte, the second layer having a second seal around a perimeter of the second layer. A third layer has third metal particles coated with yet additional solid electrolyte, the third metal particles embedded in reforming catalyst, the third layer having a third seal around a perimeter of the third layer.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Solid based fuel cells, such as SOFCs, use fuels such as hydrogen, methane and ethanol. Some solid oxide, or ceramic, electrochemical devices operate at average temperatures as high as 1000° C. As a result of these high operating temperatures, exotic materials can be required that can withstand such temperatures. Solid based fuel cells include, but are not limited to, SOFCs, solid oxide electrolyzer cells, PCFCs and all solid-state energy conversion and storage devices such as sensors and batteries. Solid based fuel cells have a wide variety of applications, from use as auxiliary power units in vehicles to stationary power generation. These devices require start-up time to heat the device to operating temperature before obtaining the required performance. A slow start-up time is disadvantageous for use of the solid based fuel cells in automobiles. To utilize hydrocarbons in solid based fuel cells that are endothermic in nature, high heating is required to maintain an adequate operating temperature throughout the device.

The high temperatures at which the solid based fuel cells operate deteriorate the devices due to, for example, differences in coefficients of thermal expansion between components, whether electrolyte-supported or electrode-supported. The heavy vibrations and extreme cycling experienced when used in automotive applications can also exacerbate deterioration.

Solid based fuel cells using non-hydrogen fuels such as methanol or ethanol require a reformer to convert the non-hydrogen fuel to hydrogen, often mixed with one or more of carbon monoxide, carbon dioxide and steam, for example, when steam reforming is used. Conventional external reformers take up valuable space when used in vehicles, for example, and add to the system cost. To minimize the system cost and footprint, on-anode internal reforming using catalyst is being developed. Conventional on-anode internal reforming catalyst is usually a poor conductor of electricity, so the addition of the reforming catalyst can add internal ohmic resistance and decrease the power output of the solid based fuel cell.

Disclosed herein are metal-reinforced solid based fuel cells that are simpler to manufacture, that are light weight and designed for quick startup, provide high performance and durability using a nano-catalyst embedded design, allow for internal reforming, are easy to scale up can be used for hydrogen production and energy conversion, and allow for easy seal options. The disclosed solid based fuel cells can be used with both SOFCs and PCFCs.

Figure 1:
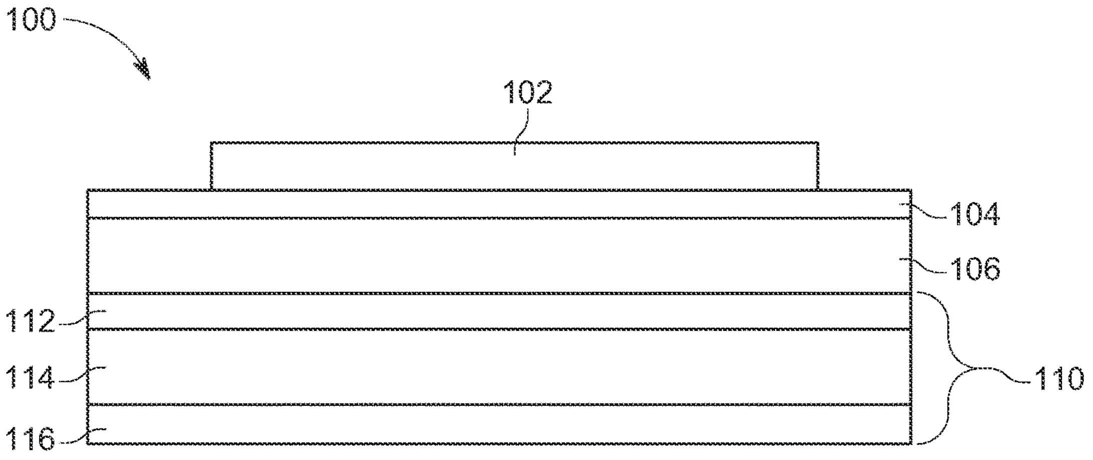
FIG. 1 is a schematic of the layers of a solid based fuel cell as disclosed herein.

An implementation of a solid based fuel cell 100 with the layers schematically illustrated in FIG. 1. The solid based fuel cell 100 has a cathode layer 102, an interlayer 104, an electrolyte layer 106, and a metal-reinforced anode 110. The metal-reinforced anode 110 has a first layer 112, a second layer 114 and a third layer 116.

Figure 2:
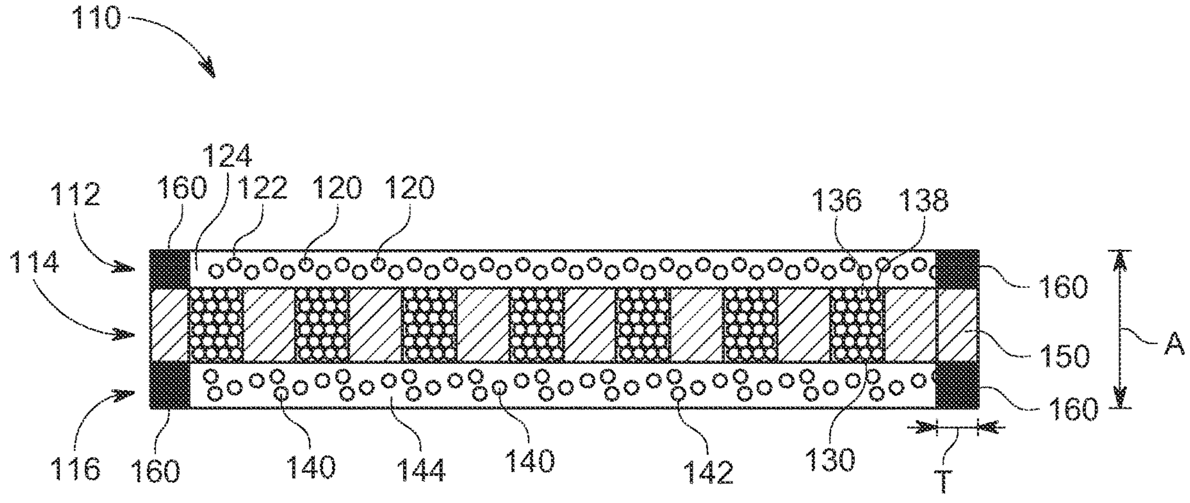
FIG. 2 is a cross-sectional view of a metal-reinforced anode of the solid based fuel cell as disclosed herein.

FIG. 2 is a cross-sectional view of the metal-reinforced anode 110 of FIG. 1. The first layer 112 of the metal-reinforced anode 110 has first metal particles 120 coated with solid electrolyte 122. The first metal particles 120 are embedded in anode active material 124. The first metal particles 120 provide physical strength to the layer and assist in bringing the fuel cell up to temperature more quickly. The solid electrolyte 122 coated on the first metal particles 120 increase the ionic conductivity of the first layer 112. The first layer 112 of the metal-reinforced anode 110 can have a thickness of between about 20 microns to 60 microns.

Figure 3:
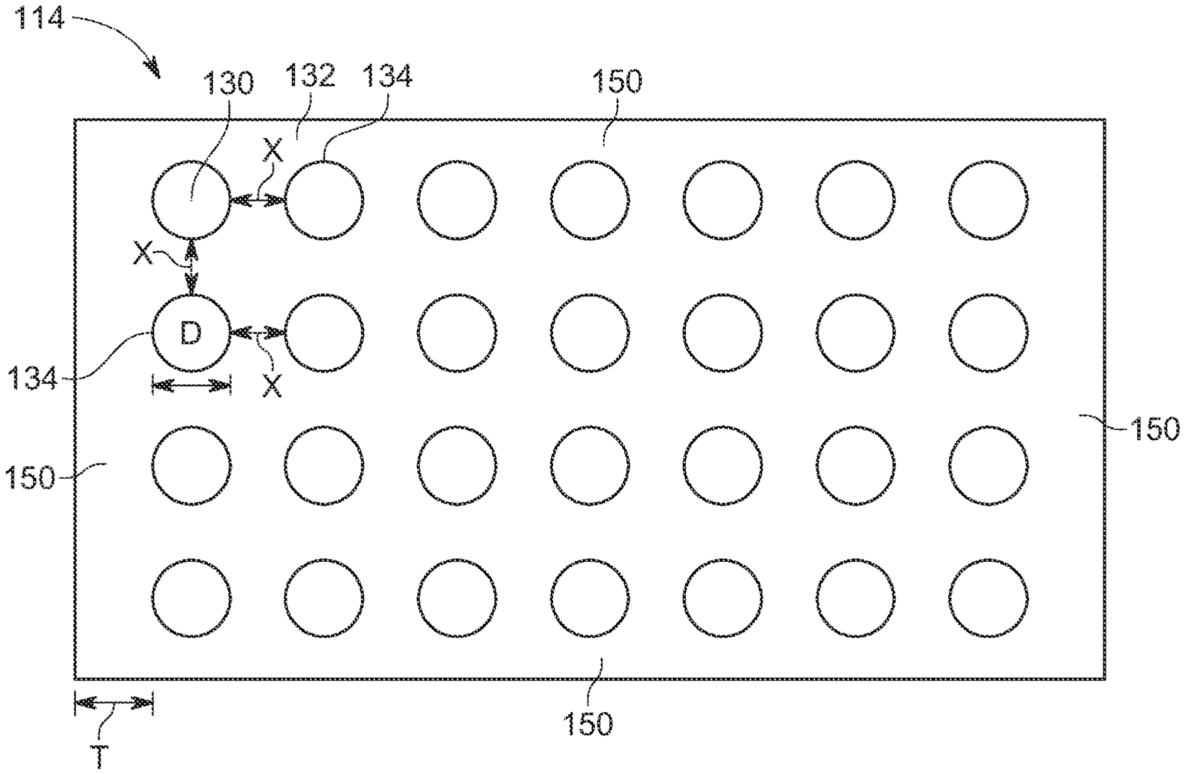
FIG. 3 is a plan view of the second layer of the metal-reinforced anode as disclosed herein.

The second layer 114 of the metal-reinforced anode 110 is a layer of metal through which holes 130 are formed in a thickness direction A. The holes 130 are best seen in FIG. 3, which is a plan view of second layer 114. The holes 130 extend through an entire thickness of the second layer 114. The holes 130 are uniformly spaced across a surface area 132 of the second layer 114. The holes 130 each have a diameter D ranging between 10 microns and 100 microns, inclusive. In one implementation, the holes 130 all have the same diameter D. This provides for ease of fabrication. Each hole 130 can be separated from an adjacent hole 134 by a distance X equal to the diameter D. The holes 130 can be etched in the second layer 114 of metal. The second layer 114 of metal can have a thickness of between 200 microns and 300 microns.

The holes 130 (shown empty in FIG. 3 and filled in FIG. 2) are filled with second metal particles 136 coated with additional solid electrolyte 138. The additional solid electrolyte 138 provides ionic conductivity through the second layer 114. The second metal particles 136 support the additional solid electrolyte 138 and fill the holes 130 to avoid internal stresses on the fuel cell. Coating the additional solid electrolyte 138 onto the second metal particles 136 has been found to keep the additional solid electrolyte 138 uniformly placed throughout the holes 130. Filling the holes 130 with solid electrolyte alone adds stresses to the second layer 114. Coating the walls of the holes 130 or partially filling the holes 130 with solid electrolyte results in the solid electrolyte deforming, ultimately impeding the performance of the ion conductivity through the second metal layer 114.

Referring back to FIG. 2, the third layer 116 of the metal-reinforced anode 110 has third metal particles 140 coated with yet additional solid electrolyte 142. The third metal particles 140 are embedded in reforming catalyst 144. The third metal particles 140 provide physical strength to the layer and assist in bringing the fuel cell up to temperature more quickly. The yet additional solid electrolyte 142 coated on the third metal particles 140 increase the ionic conductivity of the third layer 116. The inbuilt on-anode internal reforming layer as the third layer 116 reforms one or more non-hydrogen fuels. The devices herein will reduce the internal ohmic resistance caused by conventional on-anode reforming catalyst and will not compromise the power density while converting the complex hydrocarbons to reformed fuels such as hydrogen and carbon monoxide. The third layer 116 of the metal-reinforced anode 110 can have a thickness of between about 20 microns to 60 microns.

The second layer 114 of metal, the first metal particles 120, the second metal particles 136 and the third metal particles 140 may all be the same material. As an example, the metal can be stainless steel, such as 434L or Cr-rich stainless steel.

The electrolyte layer 106, the solid electrolyte 122, the additional solid electrolyte 138, and the yet additional solid electrolyte 142 can all be the same solid electrolyte. One example is a scandia- and yttria-stabilized zirconia (ScYSZ) oxide.

In the implementations of the solid based fuel cell 100 disclosed herein, a seal can be included around the perimeter of the metal-reinforced anode 110. The seal provides for easy scale-up of cells as it eliminates the need for a separate mechanical seal or shim around each cell. The seal is necessary to prevent short circuiting or cross contamination. As illustrated in FIGS. 2 and 3, second layer 114 has a seal 150 formed of a dense perimeter of metal. The dense perimeter of metal is formed during manufacture of the layer by not creating holes 130 in the border of the second layer 114. The seal 150 is between 3 microns and 5 microns in thickness T measured perpendicular to the thickness direction around the perimeter of the layer.

In first layer 112 and third layer 116, the seals 160 are formed of a dense perimeter of solid electrolyte. The seals 160 are between 3 microns and 5 microns in thickness T around the perimeter of the layers.

Figure 4:
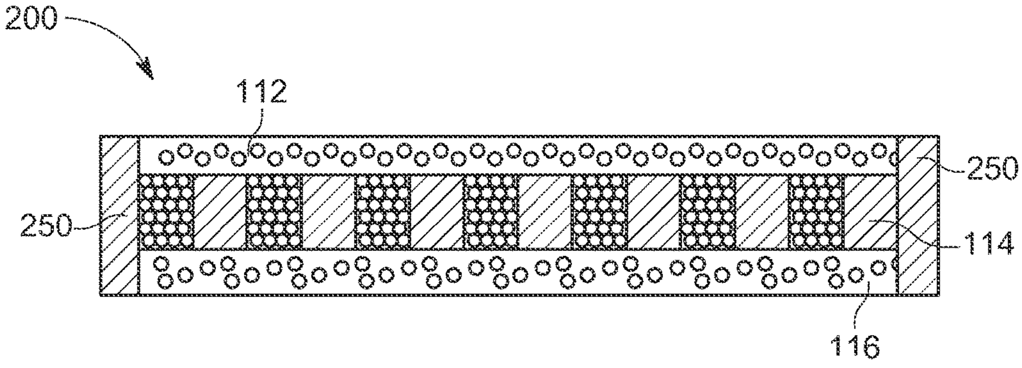
FIG. 4 is a cross section view of another aspect of a metal-reinforced anode of the solid based fuel cell as disclosed herein.

FIG. 4 is another implementation of a metal-reinforced anode 200. In FIG. 4, the first layer 112, the second layer 114 and the third layer 116 are the same as that described with respect to FIG. 2 and will not be repeated. The difference is the seal. In the implementation in FIG. 4, the seal 250 around the second layer 114 is formed of a dense perimeter of metal. The dense perimeter of metal is formed during manufacture of the layer by not creating holes 130 in the border of the second layer 114. The seal 250 is between 3 microns and 5 microns in thickness T around the perimeter of the layer. The seal 250 extends upwards in the thickness direction A to a height of the first layer 112 to provide a metal seal around the perimeter of the first layer 112. The seal 250 extends downward in the thickness direction A to a depth of the third layer 116 to provide a meal seal around the perimeter of the third layer 116.

The cathode layer 102 comprises cathode active material. The cathode active material can be, for example, lanthanum strontium cobaltite (LSC). Other examples include cerium-zirconium mixed oxides ($CeZrO_{2-y}$) with transition metals or noble metals, lanthanum strontium manganite (LSM)-based perovskites, Sr-doped lanthanum ferrite (LSF) materials, Sr-doped lanthanum ferro-cobaltite (LSCF) materials, praseodymium oxide (PrOx), and neodymium oxide (NdOx). Other non-limiting examples include $(La_{0.8}Sr_{0.2})_{0.95}MnO_3$, $La_{0.6}Sr_{0.4}CoO_3$, $Sr_{0.5}Sm_{0.5}O_3$, $Ba_{0.5}Sr_{0.5}Co_{0.8}Fe_{0.2}O_3$, $(La_{0.6}Sr_{0.4})_{0.95}(Co_{0.2}Fe_{0.8})O_3$, $PrBa_{0.5}Sr_{0.5}Co_{1.5}Fe_{0.5}O_{5+y}$ with and without Gd-doped ceria. Using a cathode layer 102 consists of cathode active material keeps the thickness of the unit cell down.

The interlayer 104 can be, for example, gadolinium-doped ceria (GDC) oxide.

The electrolyte layer 106 is formed of a dense solid electrolyte. The solid electrolyte can be scandia- and yttria-stabilized zirconia (ScYSZ) oxide as noted. The solid electrolyte may also be doped bismuth oxide, scandia-ceria-stabilized zirconia (ScCeSZ), yttria-stabilized zirconia (YSZ), scandia-, cerium- and yttria-stabilized zirconia (ScCeYSZ), oxides thereof and $La_{0.8}Sr_{0.2}Ga_{0.8}Mg_{0.2}O_3$ (LSGM).

The anode active material 124 in the first layer 112 can be, for example, one or more of nickel-based catalyst containing mixtures of cobalt and/or dopants of precious metals such as palladium, rhodium, and/or platinum, nickel-cerium oxide (Ni—CeOx), and cerium-zirconium mixed oxides ($CeZrO_{2-y}$) with transition metals or noble metals. Other non-limiting examples include Ni—YSZ (Y-stabilized zirconia), Ni-GDC (Gd-doped ceria), Ni-SDC (Sm-doped ceria), Ni—ScYSZ (Sc, Y stabilized zirconia), and perovskite anodes (e.g., $SrCo_{0.2}Fe_{0.4}Mo_{0.4}O_3$).

The reforming catalyst 144 in the third layer 116 may depend on the type of fuel being reformed. As non-limiting examples, the reforming catalyst 144 can be $Ni—BaCe_{0.7}Zr_{0.1}Y_{0.2}O_{3-\delta}$ when the fuel is methane and can be Ru—Ni—Co/CZ or CeZrOx with multivalent ions such as Fe, Ni, Co and noble metals such as Pt, Ru, Rh, Pd, Ir, when the fuel is ethanol. Another example of a reforming catalyst 144 that can be used is NiMnCuCoCe oxide.

Electrochemical devices comprise multiple solid based fuel cells 100. In order to generate useful amounts of electrical power, unit fuel cells 100 can be configured in a stack, as a non-limiting example, with multiple planar cells separated by the interconnect components that conduct electricity between the cells.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid based fuel cell, comprising:

a cathode layer;

an interlayer;

an electrolyte layer;

a metal-reinforced anode, comprising:

a first layer of first metal particles coated with solid electrolyte, the first metal particles embedded in anode active material;

a second layer of metal through which holes are formed in a thickness direction, the holes filled with second metal particles coated with additional solid electrolyte; and a third layer of third metal particles coated with yet additional solid electrolyte, the third metal particles embedded in reforming catalyst.

2. The solid based fuel cell of claim 1, wherein the holes are uniformly spaced across a surface area of the second layer, the holes each having a diameter ranging between 10 microns and 100 microns.

3. The solid based fuel cell of claim 2, wherein the diameter of each hole is equal, and each hole is separated from an adjacent hole by a distance equal to the diameter.

4. The solid based fuel cell of claim 1, wherein the second layer of metal, the first metal particles, the second metal particles and the third metal particles are of a same material.

5. The solid based fuel cell of claim 1, wherein the second layer of metal has a thickness of between 200 microns and 300 microns.

6. The solid based fuel cell of claim 1, wherein the electrolyte layer, the solid electrolyte, the additional solid electrolyte and the yet additional solid electrolyte are scandia- and yttria-stabilized zirconia (ScYSZ) oxide.

7. The solid based fuel cell of claim 1, wherein the second layer of metal has a seal around a perimeter of the second layer, the seal being metal through which no holes are formed.

8. The solid based fuel cell of claim 7, wherein the seal is 3 microns to 5 microns measured perpendicular to the thickness direction.

9. The solid based fuel cell of claim 1, wherein the first layer has a seal consisting of solid electrolyte around a perimeter of the first layer.

10. The solid based fuel cell of claim 1, wherein the third layer has a seal consisting of solid electrolyte around a perimeter of the third layer.

11. The solid based fuel cell of claim 1, wherein the first layer, the second layer and the third layer each have a seal around a perimeter of a respective layer, the seal being metal through which no holes are formed.

12. The solid based fuel cell of claim 1, wherein the reforming catalyst is NiMnCuCoCe oxide.

13. A metal-reinforced anode for a solid based fuel cell, the metal-reinforced anode comprising:

a first layer of first metal particles coated with solid electrolyte, the first metal particles embedded in anode active material, the first layer having a first seal around a perimeter of the first layer;

a second layer of metal through which holes are formed in a thickness direction, the holes filled with second metal particles coated with additional solid electrolyte, the second layer having a second seal around a perimeter of the second layer; and a third layer of third metal particles coated with yet additional solid electrolyte, the third metal particles embedded in reforming catalyst, the third layer having a third seal around a perimeter of the third layer.

14. The metal-reinforced anode of claim 13, wherein the holes are uniformly spaced across a surface area of the second layer, the holes each having a diameter ranging between 10 microns and 100 microns.

15. The metal-reinforced anode of claim 14, wherein the diameter of each hole is equal, and each hole is separated from an adjacent hole by a distance equal to the diameter.

16. The metal-reinforced anode of claim 13, wherein the second layer of metal, the first metal particles, the second metal particles and the third metal particles all being a same material.

17. The metal-reinforced anode of claim 13, wherein the second layer of metal has a thickness of between 200 microns and 300 microns.

18. The metal-reinforced anode of claim 13, wherein the solid electrolyte, the additional solid electrolyte and the yet additional solid electrolyte are scandia- and yttria-stabilized zirconia (ScYSZ) oxide.

19. The metal-reinforced anode of claim 13, wherein the reforming catalyst is NiMnCuCoCe oxide.

* * * * *